(12) United States Patent
He et al.

(10) Patent No.: US 6,507,457 B2
(45) Date of Patent: Jan. 14, 2003

(54) MAGNETIC HEAD

(76) Inventors: Qing He, 7801 Computer Ave. South NRM TR1, Bloomington, MN (US) 55435; Song S. Xue, P.O. Box 66360, Scotts Valley, CA (US) 95067-0360; Bryan K. Oliver, 920 Disc Dr., P.O. Box 66360, Scotts Valley, CA (US) 95067-0360; Patrick J. Ryan, 920 Disc Dr., P.O. Box 66360, Scotts Valley, CA (US) 95067-0360

( * ) Notice: Subject to any disclaimer, the term of this patent is extended or adjusted under 35 U.S.C. 154(b) by 0 days.

(21) Appl. No.: 09/923,981

(22) Filed: Aug. 7, 2001

(65) Prior Publication Data

US 2002/0021529 A1 Feb. 21, 2002

Related U.S. Application Data

(60) Provisional application No. 60/225,329, filed on Aug. 15, 2000.

(51) Int. Cl.[7] ............................................... G11B 5/147
(52) U.S. Cl. ................................................... 360/126
(58) Field of Search ................................. 360/119, 126, 360/122

(56) References Cited

U.S. PATENT DOCUMENTS

| | | | | |
|---|---|---|---|---|
| 5,240,740 A | * | 8/1993 | Frey et al. | 427/130 |
| 5,666,250 A | * | 9/1997 | Stageberg et al. | 360/126 |
| 5,703,740 A | * | 12/1997 | Cohen et al. | 360/123 |
| 5,793,576 A | * | 8/1998 | Gill | 360/113 |
| 5,843,521 A | * | 12/1998 | Ju et al. | 427/129 |
| 5,878,481 A | * | 3/1999 | Feng et al. | 29/603.15 |
| 5,940,253 A | * | 8/1999 | Mallary et al. | 360/126 |
| 6,144,534 A | * | 11/2000 | Xue et al. | 362/327.31 |
| 6,169,646 B1 | * | 1/2001 | Macken et al. | 360/319 |
| 6,195,232 B1 | * | 2/2001 | Cohen | 360/123 |
| 6,222,707 B1 | * | 4/2001 | Huai et al. | 360/324.1 |
| 6,260,256 B1 | * | 7/2001 | Sasaki | 29/603.01 |
| 6,296,955 B1 | * | 10/2001 | Hossain et al. | 428/692 |
| 6,301,077 B1 | * | 10/2001 | Sasaki | 360/126 |

FOREIGN PATENT DOCUMENTS

JP          6-176315          *  6/1994

OTHER PUBLICATIONS

IBM TDB "NiFe/Cu Seed Layer for Plating Coil Cu in Magnetic Recording Heads"; vol. 38, issue 6, pp. 625–626; Jun. 1995.*

IBM TDB "Laminated Seed Layers for Plated Thin Film Heads and Structures"; vol. 35, issue 1B, pp. 457–459, Jun. 1992.*

* cited by examiner

*Primary Examiner*—Brian E. Miller

(57) ABSTRACT

A magnetic head comprising a substrate, a non-magnetic seed layer deposited on the substrate, a bottom magnetic core piece positioned over and contacting the non-magnetic seed layer, a magnetic seed layer, and a top magnetic core piece positioned over and contacting the magnetic seed layer.

29 Claims, 5 Drawing Sheets

| Materials | Bs (kG) | Hc_e (Oe) | Rho (Ohm.cm) |
|---|---|---|---|
| FeCoZrTa | 20.5 | 4.2 | 123 |
| Fe60Co40 | 24 | 49.4 | 12.7 |
| CoNiFe | 21 | 34.1 | 14.12 |
| FeCoN | 22 | 25.55 | 88.7 |
| FeCoHf10 | 16 | 2.4 | 138 |
| Ni45Fe55 | 16 | | |

MAGNETIC HEAD

Priority based on provisional patent application, Serial No. 60/225,329 filed Aug. 15, 2000 entitled, "High Resistivity, High Moment Sputtered FeCoZrTa Film" is claimed.

BACKGROUND OF THE INVENTION

This invention relates to a magnetic head. More particularly, the invention relates to fabricating a magnetic head that includes a high magnetic moment and a high resistivity magnetic seed layer adjacent to a magnetic core to improve the performance of the magnetic head.

Magnetic heads are used for magnetically writing and reading data on a magnetic storage medium, such as a disc, which moves relative to the head. A magnetic head includes an upper and lower yoke and pole which form the magnetic core of the head. Electrical conductors (or coils) pass through the core which are used for both reading and writing information onto the magnetic storage medium. A first seed layer is interposed below the lower yoke and a second seed layer is interposed below the upper yoke.

During a write operation, electrical current is caused to flow through the coils generating a magnetic field in the core. A gap region occupies a small space between the two pole tips of the magnetic core. The current flowing through the coils causes magnetic flux to span the gap region. The magnetic flux is then used to impress a magnetic field upon a storage medium producing a magnetic transition, which is then recorded.

There is a constant and ever increasing demand to process data in computer systems at increasingly higher rates. This demand places a corresponding burden on magnetic storage subsystems, including magnetic heads and storage media, to store data at a higher rate and over a higher density surface area. As a consequence, the materials used in the fabrication of magnetic heads and magnetic storage media need to handle the increased demand. In particular, the performance of magnetic heads can be affected by the magnetic properties of the materials used in the core material and in each seed layer.

As the data rate increases, the magnetic materials experience the negative effects of eddy currents and hysteresis. The effects of eddy currents are caused by the current flow induced in the core by a time varying flux. This undesirable effect causes the heating of the core and a subsequent degradation in the data rate of the head. In order to reduce and offset the negative effects of eddy currents, the magnetic material used in the seed layers that form the top pole of the upper core should exhibit a high resisitivity. However, current magnetic materials that are used in the seed layer portion of a magnetic head are inadequate.

Moreover, there is also an increasing demand to process more information over a smaller surface area of a magnetic storage medium. In order to process more data over the smaller surface area, the magnitude of the magnetic flux density must increase over the decreased surface area. This higher demand for a magnetic flux density requires that the magnetic material exhibit a high magnetic moment.

In addition, the magnetic material used in the seed layer of the magnetic head should exhibit high anisotropic properties. For example, the seed layer should exhibit soft magnetic characteristics such as the ability to be easily and quickly magnetized and demagnetized. Current materials employed in seed layers do not exhibit adequate anisotropic properties.

For the foregoing reasons, an improved magnetic head, in particular an improved magnetic seed layer, with high resistivity, high magnetic moment, and desirable anisotropic properties would be a significant improvement in the art.

SUMMARY OF THE INVENTION

In general, according to one aspect, the present invention features a magnetic head. The head includes a substrate, a non-magnetic seed layer deposited on the substrate, a bottom magnetic core piece positioned over and contacting the non-magnetic seed layer, a magnetic seed layer, a top magnetic core piece positioned over and contacting the magnetic seed layer, and a gap sandwiched between at least a portion of the bottom core piece and at least a portion of the magnetic seed layer.

Various aspects of the invention may include one or more of the following features. The magnetic seed layer may be a single layer comprising an alloy of Fe, Co, Zr, and Ta. Fe may be present in the range of 50 to 80 Atomic percent, Co may be present in the range of 20 to 50 Atomic percent, Zr may be present in the range of 1 to 10 Atomic percent, and Ta may be present in the range of 1 to 10 Atomic percent, and wherein the magnetic seed layer thickness may be in the range of 500 to 5000 Angstroms.

The magnetic seed layer may be a dual layer structure comprising a base layer and a top layer. The base layer may be an alloy chosen from the group consisting of NiFe, CoFe, NiFeCr, Ta, and TaN. The base layer alloy may have a thickness in the range of 5 to 500 Angstroms. The top layer may be an alloy including Fe, Co, Zr, and Ta. Fe may be present in the range of 50 to 80 Atomic percent, Co may be present in the range of 20 to 50 Atomic percent, Zr may be present in the range of 1 to 10 Atomic percent, and Ta may be present in the range of 1 to 10 Atomic percent. The magnetic seed layer may have a thickness in the range of 500 to 5000 Angstroms.

In another aspect, the invention features a method of fabricating a magnetic head. This method may include depositing a non-magnetic seed layer on a substrate, forming a bottom portion of a magnetic core on the non-magnetic seed layer, depositing a non-magnetic material on at least a portion of the bottom portion of the magnetic core, depositing a magnetic seed layer on the non-magnetic material, and forming a top portion of the magnetic core on the magnetic seed layer, the non-magnetic material forming a gap for the head.

In one implementation, depositing the magnetic seed layer may include depositing a single layer alloy consisting of Fe, Co, Zr, and Ta. Fe may be present in the range of 50 to 80 Atomic percent, Co may be present in the range of 20 to 50 Atomic percent, Zr may be present in the range of 1 to 10 Atomic percent, and Ta may be present in the range of 1 to 10 Atomic percent. The thickness of the magnetic seed layer may be in the range of 500 to 5000 Angstroms.

Depositing the magnetic seed layer may include depositing a dual layer structure comprising a base layer and a top layer. The base alloy may be chosen from the group consisting of NiFe, CoFe, NiFeCr, Ta, and TaN. The base alloy may have a thickness in the range of 5 to 500 Angstroms. The top layer alloy may be comprised of Fe, Co, Zr, and Ta. Fe may be present in the range of 50 to 80 Atomic percent, Co may be present in the range of 20 to 50 Atomic percent, Zr may be present in the range of 1 to 10 Atomic percent, and Ta may be present in the range of 1 to 10 Atomic percent. The magnetic seed layer may have a thickness in the range of 500 to 5000 Angstroms.

Depositing the magnetic seed layer may include using Dc-magnetron sputtering. The sputtering may be performed at a power of at least 500 Watts, a gas pressure of at least 10 milli-Torr, and a magnetic field based on a current, and may further include applying a magnetic field in the range of 50 to 200 Oersted.

Depositing the magnetic seed layer may also include post-annealing at a temperature in the range from 100 to 500 Celsius. The time duration of post-annealing, which is a function of the temperature, may range from 10 minutes to 100 hours. The post-annealing process may be performed after depositing the magnetic seed layer onto the magnetic head.

In yet another aspect, the invention features a magnetic head that includes a non-magnetic seed layer deposited on the substrate, a bottom magnetic core piece positioned over and contacting the non-magnetic seed layer, a means for increasing the magnetic moment and the resistivity of the magnetic head, and a top magnetic core piece positioned over and contacting the means.

In one implementation, the means for increasing the magnetic moment and the resistivity of the magnetic head can include a magnetic seed layer comprising a single layer of an alloy of Fe, Co, Zr, and Ta. Fe may be present in the range of 50 to 80 Atomic percent, Co may be present in the range of 20 to 50 Atomic percent, Zr may be present in the range of 1 to 10 Atomic percent, and Ta may be present in the range of 1 to 10 Atomic percent. The magnetic seed layer may have a thickness in the range of 500 to 5000 Angstroms.

In another implementation, the means for increasing the magnetic moment and the resistivity of the magnetic head may include a magnetic seed layer comprising a base layer and a top layer. The base layer may be an alloy chosen from the group consisting of NiFe, CoFe, NiFeCr, Ta, TaN. The base layer may have a thickness in the range of 5 to 500 Angstroms. The top layer may be an alloy of Fe, Co, Zr, and Ta. Fe may be present in the range of 50 to 80 Atomic percent, Co may be present in the range of 20 to 50 Atomic percent, Zr may be present in the range of 1 to 10 Atomic percent, and Ta may be present in the range of 1 to 10 Atomic percent. The magnetic seed layer may have a thickness in the range of 500 to 5000 Angstroms.

The invention may provide one or more of the following advantages. The presence of a high resistivity and high moment magnetic material in the magnetic seed layer adjacent to the magnetic core structure of the head may reduce the undesirable effects of eddy currents. As a result, the head may handle higher data rates. Moreover, the high moment property of the seed layer may enable the head to process data over a higher density storage medium. The addition of a post-annealing process upon the magnetic seed layer may further increase the magnetic moment of the magnetic seed layer and may allow the magnetic head to handle an even higher data rate.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
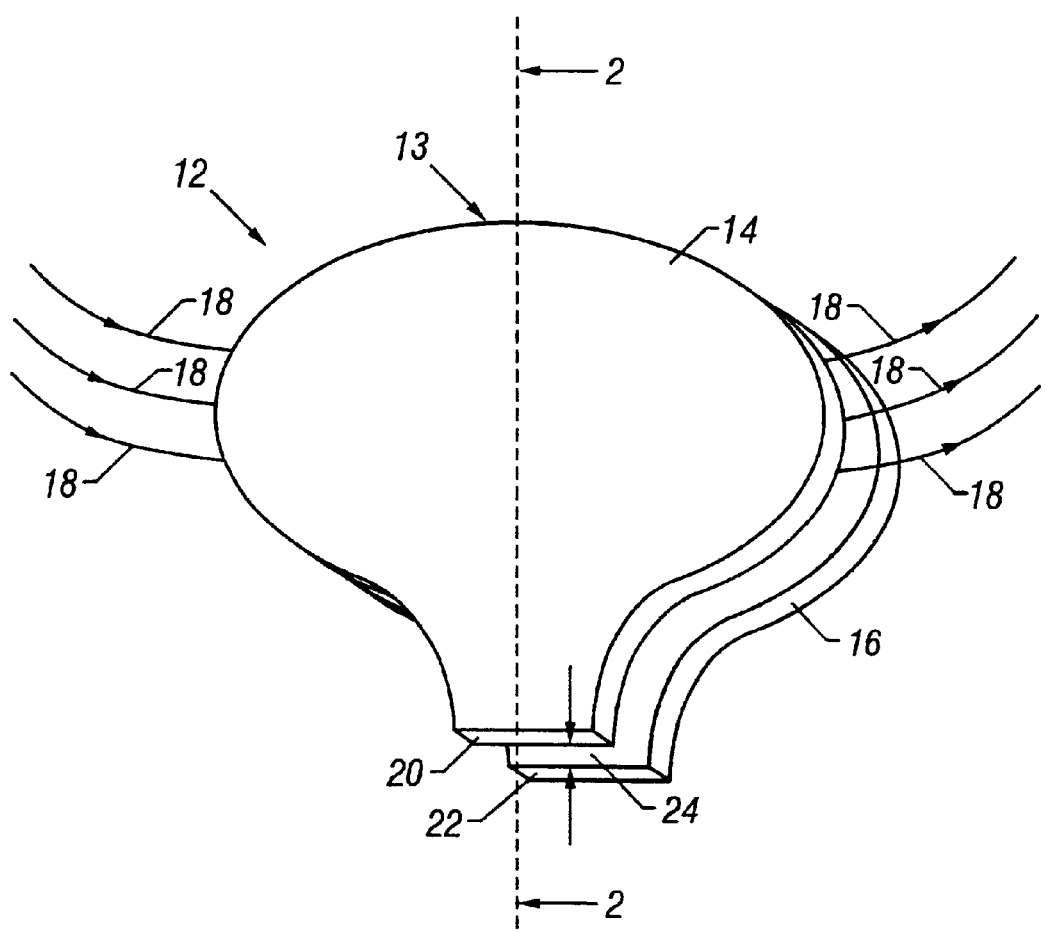
FIG. 1 is a plain view of a conventional magnetic head.

FIG. 1 is a plain view of a typical head 12 comprising a core 13, including an upper core piece 14 and a lower core piece 16. Coil turns 18 extend through the head 12 and are sandwiched between the upper core piece 14 and the lower core piece 16. The upper core piece 14 includes an upper core tip 20, while the lower core piece 16 includes a lower core tip 22. A gap 24 is formed between the upper pole tip 20 and the lower pole tip 22. Typically, alumina fills the gap. A magnetic storage medium (not shown) may be placed near the gap 24 such that information may be written on or read from the medium.

Figure 2:
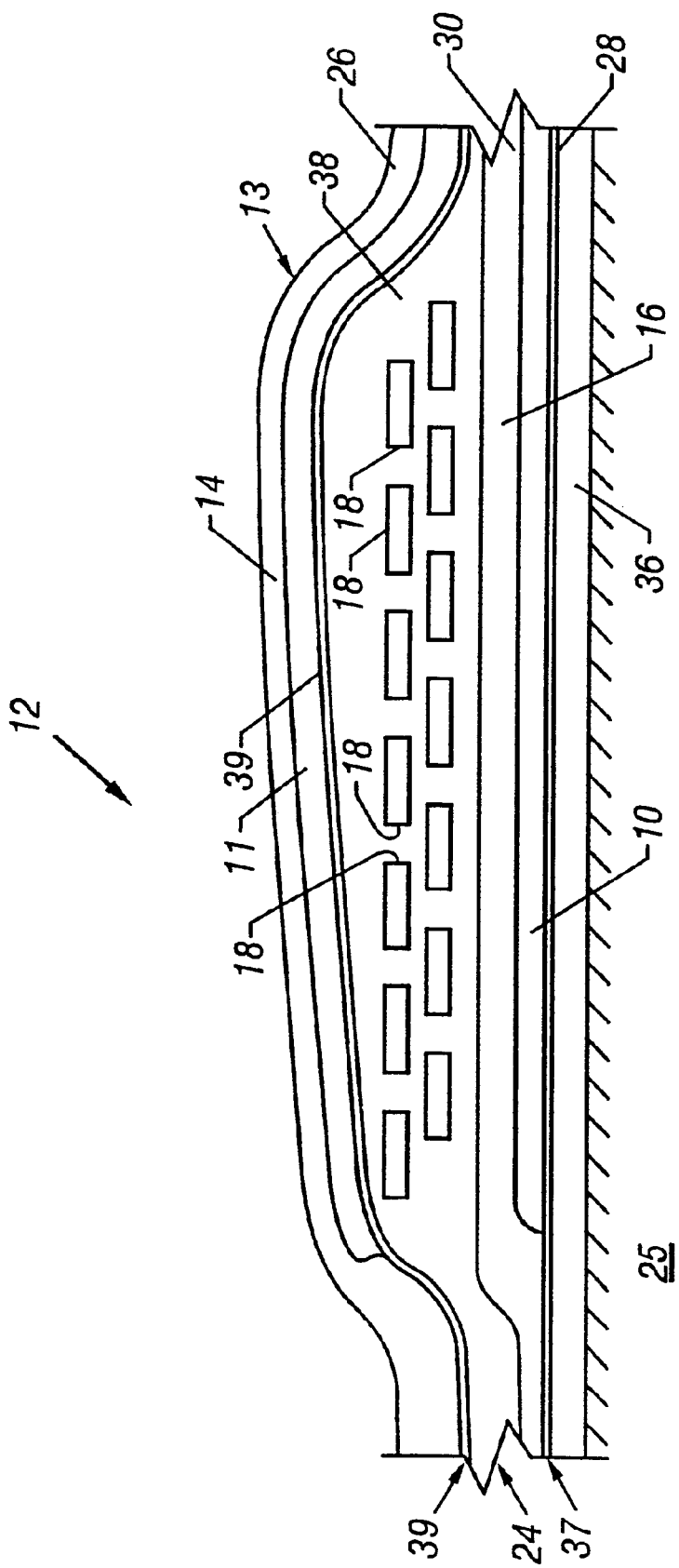
FIG. 2 is a cross sectional view of a magnetic head made in accordance with the present invention.

FIG. 2 is a cross sectional view of the head 12 in an implementation of the present fabrication process. The process begins with a basecoat 36 deposited onto a substrate 25. The basecoat 36 may be a non-conductive alumina material and that is typically applied with sputtering techniques. During the fabrication process, multiple heads similar to heads 12 may be deposited across an entire surface of the substrate 25. For the purposes of this example, however, only the fabrication of a single head 12 is shown. A non-magnetic seed layer 37 can serve as the foundation for the bottom of the core 13. A thin film layer of magnetic material, such as permalloy, may be applied across the surface of the non-magnetic seed layer 37. This film layer forms the bottom of the magnetic core 13 including a lower yoke 10, a lower rear portion 28, and part of a center 30. The non-magnetic seed layer 37 may be deposited upon the bottom of the core 13 using photolithographic techniques. Next, the coil turns 18 are deposited upon the insulating layer 38 and are wound around the center 30. The insulating layer 38 is built up to cover the coil turns 18. A magnetic seed layer 39 is then deposited onto layer 38 and an additional set of layers of magnetic material such as permalloy may be deposited over the layer 39. This additional layer may include an upper yoke 11, an upper pole piece 14, a rear upper portion 26, and a portion of the center 30. These additional layers may be deposited using either an electrodeposition or a sputtering technique.

Figure 3:
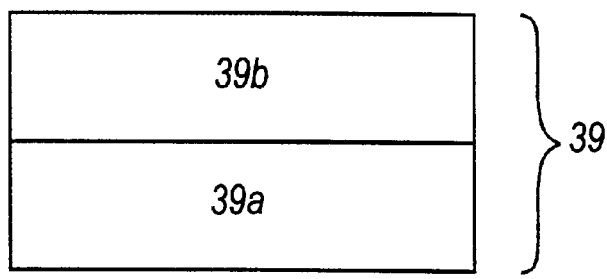
FIG. 3 is a cross sectional view of the magnetic seed layer made in accordance with the present invention.

FIG. 3 shows an implementation of an improved magnetic seed layer 39 which is sandwiched between the insulating layer 38 and the top of the magnetic core 13. In one embodiment, the seed layer 39 includes a base seed layer 39a and a top seed layer 39b. The base seed layer 39a may be comprised of an alloy chosen from the group consisting of NiFe, CoFe, NiFeCr, Ta, and TaN. The base seed layer 39a may have a thickness within the range of 5 to 500 Angstroms.

Figure 3A:
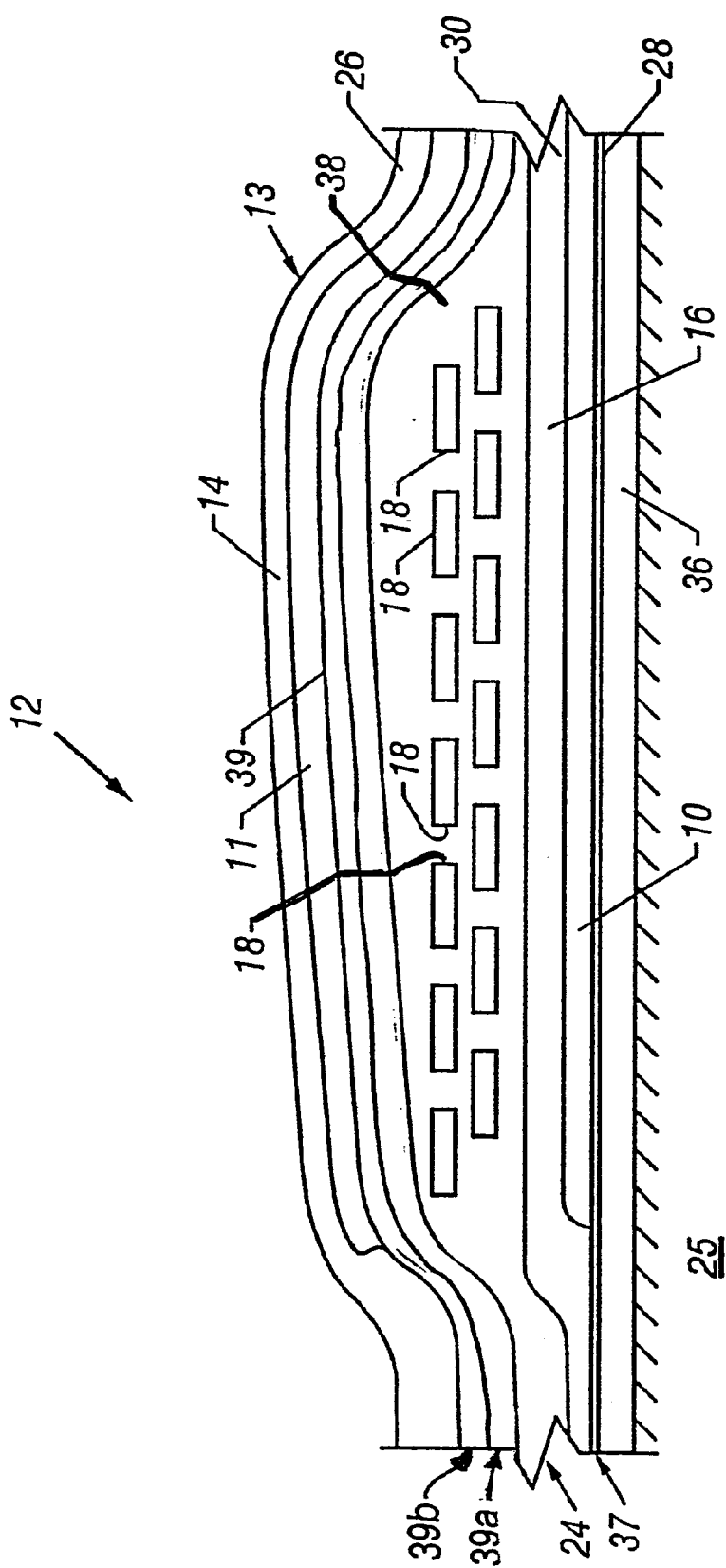
FIG. 3A is a cross sectional view of a magnetic head in accordance with an implementation of the present invention.

FIG. 3A is a cross sectional view of a magnetic head in accordance with the implementation shown in FIG. 3. In this implementation, the magnetic head 12 includes a magnetic seed layer 39 having a base seed layer 39a and a top seed layer 39b. Another implementation of the magnetic seed layer 39 may include a single layer having characteristics as described herein.

The top seed layer 39b is deposited upon the base seed layer 39a and may be an alloy consisting of Fe, Co, Zr, and Ta. In an embodiment of the alloy, Fe may be present in the range of 50 to 80 Atomic percent, Co may be present in the range of 20 to 50 Atomic percent, Zr may be present in the range of 1 to 10 Atomic percent, and Ta may be present in the range of 1 to 10 Atomic percent.

The magnetic seed layer 39 may be deposited onto the core 38 using a sputtering process. A suitable sputtering process includes using a DC-magnetron sputtering technique at a power of at least 500 Watts, a gas pressure of at least 10 milli-Torrs, and a magnetic field based on a current. The magnetic properties, such as the magnetic moment, of the magnetic seed layer 39 may be improved by applying a post-annealing process. For example, the seed layer 39 may be annealed at a temperature in the range from 100 to 500 Celsius and for a duration that depends on the temperature which can be in the range from 10 minutes to 100 hours. Moreover, the magnetic moment of the material can be further improved by applying a magnetic field in the range from 50 to 200 Oersteds during this post-annealing process.

In another embodiment, the magnetic seed layer 39 can be comprised of only a single layer formed from the same alloy, Fe, Co, Zr, and Ta, as discussed above. However, the dual layer magnetic seed layer 39 may exhibit a higher magnetic moment compared to the single layer magnetic seed layer. A magnetic head with a higher magnetic moment seed layer may be able to process data at a higher data rate than a head with a lower magnetic moment seed layer.

The magnetic properties exhibited by the present magnetic seed layer may enable a magnetic head to operate in high data rate and high-density applications, such as in a telecommunications or a network environment where data may need to be accessed quickly and data storage may be at a premium.

Figure 4:
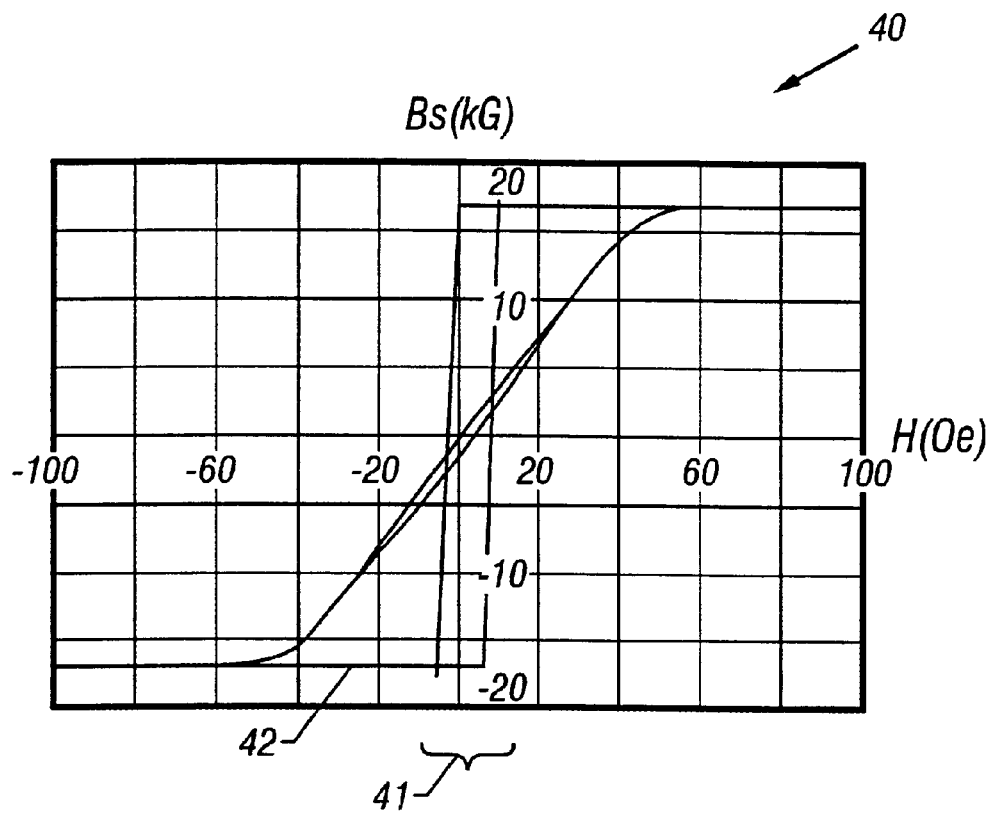
FIG. 4 is a graph showing the hysteresis curve of a magnetic seed layer made in accordance with the present invention.

As shown in FIG. 4, the hysteresis curve graph 40 reveals the improved anisotropic properties of a FeCoZrTa magnetic seed layer. The H axis represents the magnetic force, in Oersted units, which may be present in the magnetic seed layer produced by the flow of current through the core. The B axis represents the magnetic flux, in nano-Webers, that may be produced by the magnetic seed layer as a result of a magnetic force H. As shown by the narrow width 41 between the legs of the hysteresis loop 42, the magnetic seed layer may also exhibit a low coercivity. The low coercivity is characteristic of a magnetic material with "soft" magnetic properties which enable the magnetic material to be easily magnetized and demagnetized. As a result, the magnetic seed layer is able to process data at a high data rate.

Figure 5:
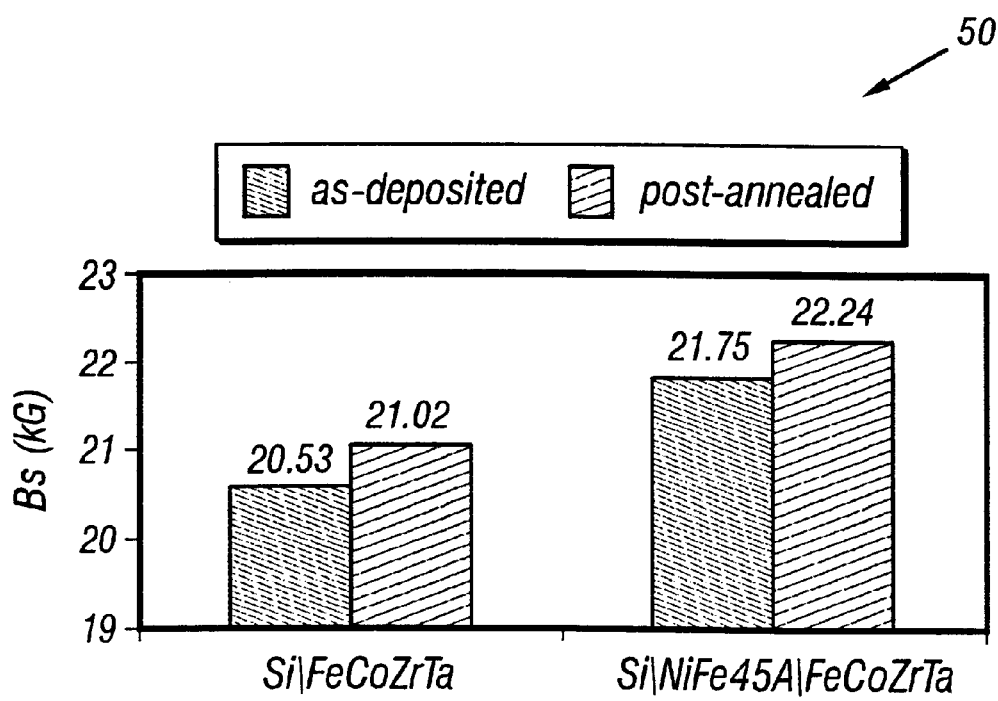
FIG. 5 is a graph comparing the performance of a single layer magnetic seed layer with a dual layer magnetic seed layer and the effects of post-annealing.

FIG. 5 depicts a performance graph 50 that shows how the magnetic moment Bs of a magnetic head may be improved by adding a FeCoZrTa magnetic seed layer. When the magnetic seed layer is deposited onto a substrate, such as Silicon, without post annealing, the magnetic moment Bs 52 is about 20.53 kG. The magnetic moment Bs 54 is improved after post annealing as shown by the increased magnetic moment Bs value of about 21.02 kG.

In order to dramatically increase the magnetic moment Bs of the magnetic material, a dual magnetic seed layer may be used. As discussed before, the dual seed layer is fabricated using a base seed layer 39a and a top seed layer 39b. As a result of the dual layer structure, the magnetic moment Bs 56 is then increased to 21.75 kG. The base seed layer 39a, as discussed earlier, can be comprised of a NiFe layer with a thickness of about 45 Angstroms. Moreover, the magnetic moment Bs can be increased even further by subjecting the seed layer to post-annealing. As shown, the magnetic moment Bs 58 experiences an increase from 21.75 kG, as deposited, to 22.24 kG after the post-annealing process.

Figures 6, 7:
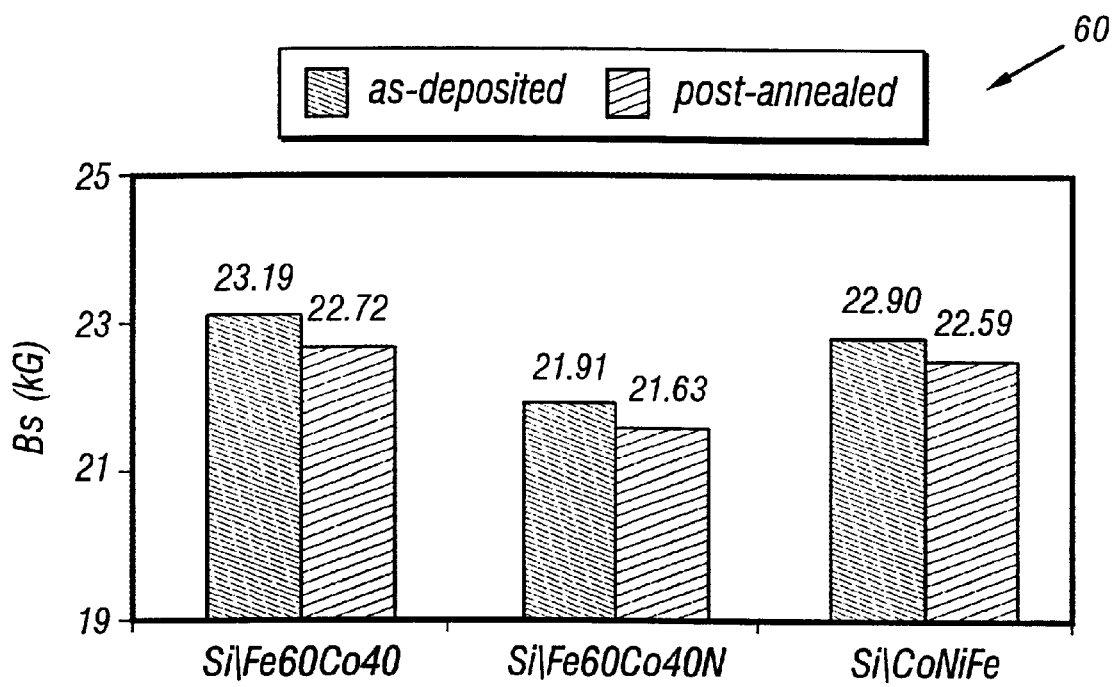
FIG. 6 is a graph showing the effects of post-annealing on the magnetic moment on some high magnetic moment materials.
FIG. 7 is a table comparing the magnetic properties of various high magnetic moment materials.

FIG. 6 is a comparison graph 60 that shows the effect of post-annealing on the magnetic moment Bs of some traditional magnetic materials. These magnetic materials exhibit about a 2% decrease in magnetic moment Bs when a post-annealing process is applied. For example, the magnetic moment Bs 62 of Fe60Co40 decreases from 23.19 kG to a magnetic Bs 64 22.72 kG after the application of the post-annealing process. In contrast, referring to FIG. 5, the magnetic moment Bs (52, 54, and 56,58) of the FeCoZrTa magnetic material increases after the application of a post-annealing process. The increase in magnetic moment Bs exhibited by a magnetic seed layer comprising FeCoZrTa enables a magnetic head to generate a higher flux density.

The table 70 of FIG. 7 compares some magnetic properties of various known high moment materials used in the fabrication of magnetic heads. As shown, a magnetic head comprising a FeCoZrTa magnetic seed layer exhibits overall improved magnetic properties.

For example, in order to generate a high flux density, a magnetic head should have a high magnetic moment Bs. As shown in the table, the magnetic moment Bs of FeCoZrTa is within the range of the listed magnetic materials. It is slightly lower than Fe60Co40, but slightly higher than Ni45Fe55. But as shown in FIG. 5, FeCoZrTa exhibits an increase in the magnetic moment Bs when a post-annealing process is applied. In contrast, the other magnetic materials in table 7 experience a reduction in magnetic moment Bs after post-annealing. For example, referring to FIG. 6, the magnetic moment Bs of CoNiFe decreases from 22.90 kG to 22.59 kG after post-annealing.

The coercivity of a magnetic material is represented by $Hc\_e$. For example, FeCoZrTa has a value of 4.2 oersted which is significantly lower than the other traditional magnetic materials such as CoNiFe with a value of 34.1 Oersted. A magnetic seed layer with a low coercivity $Hc\_e$ exhibits high soft magnetic properties enabling a magnetic head to magnetize and demagnetize quickly, which is essential in high data rate applications.

The magnetic material used in a head should also be characterized by a high resistivity Rho which tends to minimize the generation of eddy currents due to a time-varying flux. The FeCoZrTa material, as shown in the table, is characterized by a significantly high resistivity Rho of 123 Ohm.cm compared to the other materials listed in the table.

Unlike conventional magnetic seed layers, the FeCoZrTa seed layer is characterized by high resistivity, soft magnetic properties, good thermal stability, as well as high saturation magnetic moment. These properties make the seed layer attractive for high data rate and high density applications.

A number of embodiments of the invention have been described. Nevertheless, it will be understood that various modifications may be made without departing from the spirit and scope of the invention. For example, the magnetic material FeCoZrTa used in the magnetic seed layer 39 can also be used as a substitute for the non-magnetic seed layer 37. Accordingly, other embodiments are within the scope of the following claims.

What is claimed is:

1. A magnetic head comprising:
   a substrate;
   a non-magnetic seed layer deposited on the substrate;
   a bottom magnetic core piece positioned over and contacting the non-magnetic seed layer;
   a magnetic seed layer comprising of an alloy of Fe, Co, Zr, and Ta; and
   a top magnetic core piece positioned over and contacting the magnetic seed layer.

2. The head of claim 1 wherein Fe is present in the range of 50 to 80 Atomic percent, Co is present in the range of 20 to 50 Atomic percent, Zr is present in the range of 1 to 10 Atomic percent, and Ta is present in the range of 1 to 10 Atomic percent.

3. The head of claim 1 wherein the magnetic seed layer has a thickness in the range of 500 to 5000 Angstroms.

4. The head of claim 1 wherein the magnetic seed layer is a dual layer comprising a base layer and a top layer.

5. The head of claim 4 wherein the base layer is an alloy chosen from the group consisting of NiFe, CoFe, NiFeCr, Ta, TaN.

6. The head of claim 5 wherein the base layer has a thickness in the range of 5 to 500 Angstroms.

7. The head of claim 4 wherein the top layer is an alloy of Fe, Co, Zr, and Ta.

8. The head of claim 7 wherein Fe is present in the range of 50 to 80 Atomic percent, Co is present in the range of 20 to 50 Atomic percent, Zr is present in the range of 1 to 10 Atomic percent, and Ta is present in the range of 1 to 10 Atomic percent.

9. The head of claim 4 wherein the magnetic seed layer has a thickness in the range of 500 to 5000 Angstroms.

10. A method of fabricating a magnetic head comprising:
    depositing a non-magnetic seed layer on a substrate;
    forming a bottom portion of a magnetic core on the non-magnetic seed layer;
    depositing a non-magnetic material on at least a portion of the bottom portion of the magnetic core;
    depositing a magnetic seed layer on the non-magnetic material, wherein the magnetic seed layer is a single layer comprising an alloy of Fe, Co, Zr, and Ta; and
    forming a top portion of the magnetic core on the magnetic seed layer.

11. The method of claim 10, wherein Fe is present in the range of 50 to 80 Atomic percent, Co is present in the range of 20 to 50 Atomic percent, Zr is present in the range of 1 to 10 Atomic percent, and Ta is present in the range of 1 to 10 Atomic percent.

12. The method of claim 10, wherein the magnetic seed layer has a thickness in the range of 500 to 500 Angstroms.

13. The method of claim 10 wherein the magnetic seed layer comprises a base layer upon which a top layer is deposited.

14. The method of claim 13 wherein the base layer is an alloy chosen from the group consisting of NiFe, CoFe, NiFeCr, Ta, and TaN.

15. The method of claim 14 wherein the base layer has a thickness in the range of 5 to 500 Angstroms.

16. The method of claim 13 wherein the top layer is an alloy of Fe, Co, Zr, and Ta.

17. The method of claim 16 wherein Fe is present in the range of 50 to 80 Atomic percent, Co is present in the range of 20 to 50 Atomic percent, Zr is present in the range of 1 to 10 Atomic percent, and Ta is present in the range of 1 to 10 Atomic percent.

18. The method of claim 13 wherein the magnetic seed layer has a thickness in the range of 500 to 5000 Angstroms.

19. The method of claim 10 wherein the magnetic seed layer is deposited using Dc-magnetron sputtering.

20. The method of claim 19 wherein the sputtering is performed at a power of at least 500 Watts, a gas pressure of at least 10 milli-Torr, and a magnetic field based on a current.

21. The method of claim 20 further comprising applying the magnetic field in the range from 50 to 200 Oersted.

22. The method of claim 10 further comprising annealing the magnetic seed layer.

23. The method of claim 22 wherein annealing occurs at a temperature in the range from 100 to 500 Celsius based on a time duration.

24. The method of claim 23 wherein annealing occurs after depositing the magnetic seed layer.

25. A magnetic head comprising:
    a substrate;
    a non-magnetic seed layer deposited on the substrate;
    a bottom magnetic core piece positioned over and contacting the non-magnetic seed layer;
    a magnetic seed layer including a base layer and a top layer, said top layer comprising an alloy of Fe, Co, Zr, and Ta; and
    a top magnetic core piece positioned over and contacting the magnetic seed layer.

26. The method of claim 25, wherein Fe is present in the range of 50 to 80 Atomic percent, Co is present in the range of 20 to 50 Atomic percent, Zr is present in the range of 1 to 10 Atomic percent, and Ta is present in the range of 1 to 10 Atomic percent.

27. The method of claim 25, wherein the magnetic seed layer has a thickness in the range of 500 to 500 Angstroms.

28. The method of claim 25, wherein the magnetic seed layer has a thickness in the range of 500 to 500 Angstroms.

29. The method of claim 28, wherein the magnetic seed layer has a thickness in the range of 500 to 500 Angstroms.

* * * * *